(12) United States Patent  
Itoo et al.

(10) Patent No.: US 9,291,249 B2
(45) Date of Patent: Mar. 22, 2016

(54) GEAR STRUCTURE OF TRANSMISSION

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Taisuke Morita, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/258,214

(22) Filed: Apr. 22, 2014

(65) Prior Publication Data

US 2015/0300478 A1 Oct. 22, 2015

(51) Int. Cl.
 *F16H 3/08* (2006.01)
 *F16H 55/12* (2006.01)

(52) U.S. Cl.
 CPC . *F16H 55/12* (2013.01); *F16H 3/08* (2013.01)

(58) Field of Classification Search
 USPC .................................................. 74/325, 333
 See application file for complete search history.

(56) References Cited

U.S. PATENT DOCUMENTS 7,533,755 B2 * 5/2009 Miyazaki et al. ............. 180/336
2006/0058148 A1 * 3/2006 Miyazaki et al. ............. 475/200

FOREIGN PATENT DOCUMENTS

JP 2002-213611 7/2002

* cited by examiner

*Primary Examiner* — Ha D Ho
(74) *Attorney, Agent, or Firm* — Wenderoth, Lind & Ponack, L.L.P.

(57) ABSTRACT

A transmission includes: a counter low-gear with a low-gear body and a boss fit into the low-gear body so that driving force can be transmitted, and provided with dog-claws and an expanded part at one axial end and that is axially non-movably and rotatably fit around a counter shaft. A counter high-gear with a high-gear body is arranged in the one side from the low-gear body and with a cylinder including dog-claws at the one axial end thereof and is axially non-movably and rotatably fit around the boss. A shift sleeve is axially movably spline-fit around the counter shaft, and is arranged in the one side from the counter high-gear and that includes dog-claws capable of engaging with the dog-claws of the gears. The high-gear body is axially non-movably arranged between the low-gear body and the expanded part.

5 Claims, 6 Drawing Sheets

GEAR STRUCTURE OF TRANSMISSION

BACKGROUND OF THE INVENTION

1. Field of the Invention

The present invention relates to a gear structure of a transmission configured to achieve gear-shift between a plurality of gear positions when a single shift sleeve is operated.

2. Description of the Related Art

A conventional transmission is configured to achieve gear-shift between a plurality of gear positions when a single shift sleeve is operated. FIG. 6 shows such a conventional transmission. At the right end of an input shaft 100 for changing gear, a low gear 110 for low-speed forward movement, and a high gear 120 for high-speed forward movement are arranged adjacent to each other in the axial direction. Then, a reverse gear 130 for backward movement is arranged at the left end of the input shaft 100. Further, at the center, a shift sleeve 140 is axially movably spline-fit.

The low gear 110 includes a boss part 111 extending leftward from a low-gear body part 113 provided with gear teeth formed on the outer periphery thereof and is rotatably fit onto the input shaft 100 with a needle bearing in between. Then, dog claws 112 are formed at the left end of the boss part 111.

The high gear 120 includes a cylindrical part 121 extending so as to open leftward from a high-gear body part 123 provided with gear teeth formed on the outer periphery thereof, and is rotatably fit onto the outer periphery of the boss part 111 with a needle bearing in between. Then, dog claws 122 are formed at the left end of the cylindrical part 121.

The reverse gear 130 includes dog claws 131 formed on the right end surface of the reverse gear body part provided with gear teeth formed on the outer periphery thereof, and is rotatably fit onto the input shaft 100 with a needle bearing in between.

The shift sleeve 140 includes dog claws 141 for backward movement formed in the left end and dog claws 142 for forward movement formed in the right end. When the shift sleeve 140 is moved in an axial direction so that the shift sleeve 140 is brought into dog coupling to any one of the reverse gear 130, the low gear 110, and the high gear 120, transmission of a driving force is achieved between the input shaft 100 and any one of the gear 110, 120, or 130 fit rotatably onto the input shaft 100.

At the left side of the boss part 111 of the low gear 110, a press body 102 is provided that is fit and inserted between the dog claws 112 in the axial direction and extends outwardly in the diameter direction. The press body 102 abuts approximately against the left end of the boss part 111 and abuts approximately against the left end of the high-gear body part 123 of the high gear 120. This achieves positioning of the left ends of both gears 110 and 120 in the axial direction. The press body 102 is axially non-movably arranged on the input shaft 100 with washers 103 and 104 by using a circlip 105. As a prior art reference, Japanese Laid-Open Patent Publication No. 2002-213611 is known.

Meanwhile, when the low gear 110 and the high gear 120 are to be attached to the input shaft 100, first, the low gear 110 is attached to the outer periphery of the input shaft 100 with the needle bearing in between. Then, in a manner of being adjacent to the left side of the low-gear body part 113 with a washer 106 in between, the high gear 120 is attached to the outer periphery of the boss part 111 from the left side with a needle bearing in between. After that, in a manner of being fit and inserted between the dog claws 112 in the axial direction, the press body 102 is attached so as to abut approximately against the left end of the boss part 111 and the left end of the high-gear body part 123. Further, at the left end surface of the press body 102, the circlip 105 is axially non-movably arranged on the input shaft 100 with the washers 103 and 104.

In this case, after the high gear 120 is attached, the press body 102, the washers 103 and 104, and the circlip 105 need be attached to the inner side of the cylindrical part 121 from the left side. Thus, assembly workability of these components and checking workability of the assembled state have required time and effort.

SUMMARY OF THE INVENTION

The present invention has been made in view of the above-mentioned problems. An object thereof is to improve the assembly workability of a transmission configured to achieve gear-shift between a plurality of gear positions with single shift sleeve.

In order to achieve the above-mentioned object, the present invention provides a gear structure of a transmission, comprising:

a first gear that is provided with a first gear body including first gear teeth formed on an outer periphery thereof and with a boss part fit into an inner diameter part of the first gear body so that a driving force can be transmitted and provided with first dog claws and an expanded diameter part integrally at an end part extending in one axial direction and that is axially non-movably and rotatably fit onto an outer periphery of a transmission shaft;

a second gear that is provided with a second gear body arranged in the one direction relative to the first gear body and including second gear teeth formed on an outer periphery thereof and with a cylindrical part including integrally second dog claws in an end part extending in the one direction from the second gear body and that is axially non-movably and rotatably fit onto an outer periphery of the boss part; and a shift sleeve that is axially movably spline-fit onto the transmission shaft and is arranged in the one direction relative to the second gear and that includes sleeve-side dog claws capable of engaging with the first and the second dog claws, wherein the second gear body is axially non-movably arranged between the first gear body and the expanded diameter part.

According to the above-mentioned configuration, the first gear is divided into the first gear body and the boss part. This permits the second gear to be attached from the other side of the first gear. By virtue of this, a positioning component that is arranged in the inner side of the cylindrical part extending in the one axial direction relative to the second gear and that positions one side of the axial direction of the first and the second gears can be attached to the transmission shaft before the second gear is attached. That is, the work is avoided that after the second gear is attached to the transmission shaft, the positioning component is attached to the inner side of the cylindrical part whose inside is hard to be seen.

Further, the expanded diameter part can be integrally formed in the boss part with the first dog claws. Thus, the number of components arranged in the inner side of the cylindrical part can be reduced. Accordingly, assembly work to the inner side of the cylindrical part whose inside is hard to be seen can be avoided and the number of components arranged in the inner side of the cylindrical part can be reduced. This improves the assembly workability of the transmission.

In the above-mentioned gear structure of a transmission, the following configurations can be preferably employed.

(1) The other end of the first gear body and the other end of the boss part of the first gear are located approximately at the same position in the axial direction.

According to the above-mentioned configuration (1), when it is confirmed that the other end of the first gear body and the other end of the boss part are located approximately at the same position, the assembled state of the gear structure can easily be checked.

(2) The first gear body is spline-fit onto the outer periphery of the boss part.

According to the above-mentioned configuration (2), even in a construction that the first gear is divided into the first gear body and the boss part, the first gear body can be connected to the boss part so that a driving force can be transmitted.

(3) A bearing for supporting rotatably the other end part of the transmission shaft in a case member is arranged on the other side relative to the first gear, and the inner diameter of the bearing is smaller than the inner diameter of the boss part.

According to the above-mentioned configuration (3), when the first and the second gears and the like are to be removed from the transmission shaft at the time of maintenance or the like, detachment and attachment of the gears are achieved from the other side of the transmission shaft. Thus, other components such as the shift sleeve located on the one side need not be removed. This permits easy removal of the first and the second gears and the like and hence improves the maintainability of the transmission.

(4) In a state that the above-mentioned configuration (3) is provided, the first gear is a low gear for low-speed forward movement and the second gear is a high gear for high-speed forward movement.

According to the above-mentioned configuration (4), the present invention can preferably be implemented in the gear structure of a transmission including a low gear for low-speed forward movement and a high gear for high-speed forward movement. Further, the low gear that tends to be inputted a larger torque is arranged near the bearing for supporting the transmission shaft. This easily restrains deflection in the transmission shaft.

DETAILED DESCRIPTION OF THE INVENTION

One embodiment of the present invention is described below with reference to the accompanying drawings. Here, for the sake of the convenience in describing, the forward and the backward directions of the utility vehicle are used also for referring to the forward and the backward directions of the transmission and other components. Further, in the vehicle width directions, the right and the left directions viewed from the passenger of the utility vehicle (that is, the right and the left in a situation that the forward is viewed from the utility vehicle) are used also for referring to the right and the left directions of the transmission and other components.

Figure 1:
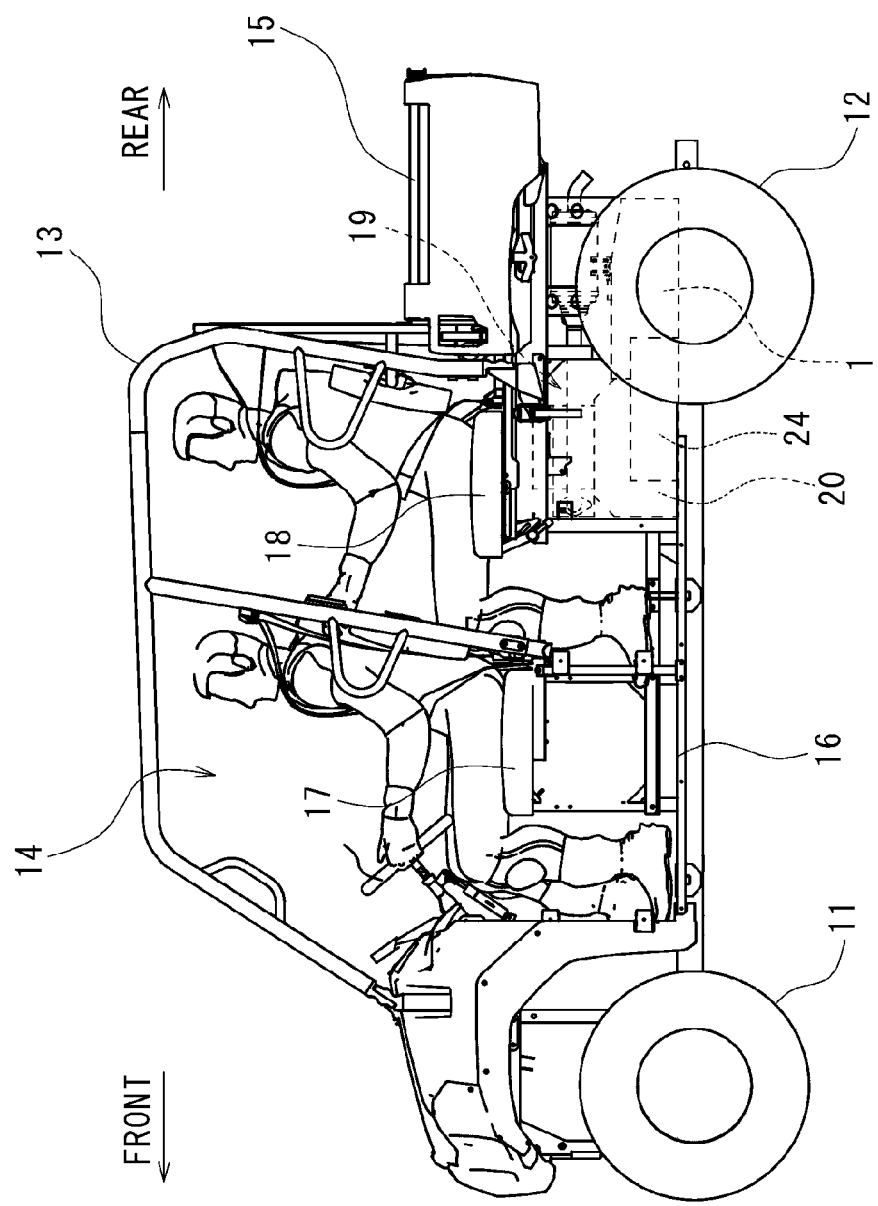
FIG. 1 is a left side view of a utility vehicle including a transmission according to one embodiment of the present invention.

FIG. 1 is a left side view of a utility vehicle including a transmission according to the present embodiment, with shell constituent members such as doors being removed. As shown in FIG. 1, the utility vehicle includes: a pair of right and left front wheels 11 located in a front part; and a pair of right and left rear wheels 12 located in a rear part. Then, a cabin space 14 surrounded by a ROPS 13 is provided between the front wheels 11 and the rear wheels 12, and a rear deck 15 is provided behind the cabin space 14. The ROPS 13 is an abbreviation of a rollover protective structure.

The inside of the cabin space 14 is provided with: a floor panel 16 that forms a floor; a front seat 17; and a rear seat 18. An engine room 19 is formed and extends from a part under the rear seat 18 to a part under the rear deck 15. An engine 20, a transmission 1, and a V-belt type continuously variable transmission 24 are arranged in the engine room 19.

Figure 2:
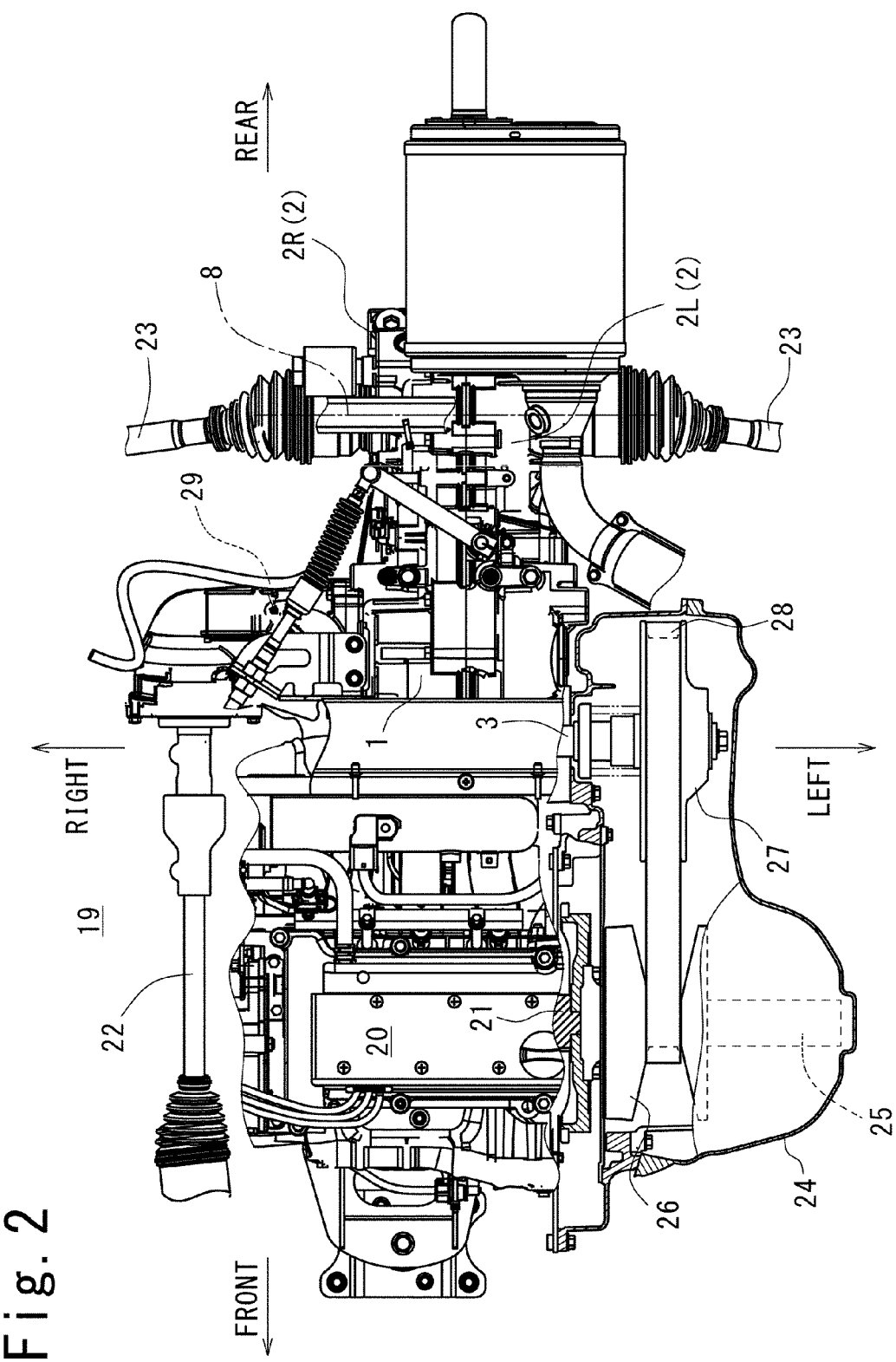
FIG. 2 is a top view of an engine, a V-belt type continuously variable transmission, and a transmission.

FIG. 2 is a top view of the engine room 19, showing the inside of the V-belt type continuously variable transmission 24 in transparent view. The engine 20 is arranged such that the axis of the crankshaft 21 aligns with the vehicle width direction. The transmission (a gear type transmission) 1 is arranged behind the engine 20. The V-belt type continuously variable transmission 24 is arranged on the left side surface of the engine 20 and the transmission 1. The transmission case 2 that constitutes the outline of the transmission 1 is constructed from a pair of left and right case members 2L and 2R connected to each other at the center mating surface.

The transmission 1 is configured such that a driving force inputted to the input shaft 3 for gear-shift is decelerated at a predetermined deceleration gear ratio and then transmitted to the two-wheel drive to four-wheel drive change mechanism 29 and the propeller shaft 22 for the front wheels 11 and, at the same time, the driving force is transmitted from the output shaft 8 for the rear wheels 12 (the shaft axis alone is shown) to the drive shafts 23.

The V-belt type continuously variable transmission 24 includes: a drive shaft 25 coupled to the crankshaft 21 of the engine 20; a drive pulley 26 arranged on the drive shaft 25; a driven pulley 27 arranged on the input shaft 3 of the transmission 1; and a V-belt 28 wound around between the drive pulley 26 and the driven pulley 27. Then, the V-belt type continuously variable transmission 24 is configured such that the driving force from the crankshaft 21 of the engine 20 is decelerated automatically in accordance with the revolving speed of the crankshaft 21 and the load on the transmission 1 and then transmitted to the input shaft 3 of the transmission 1.

Figure 3:
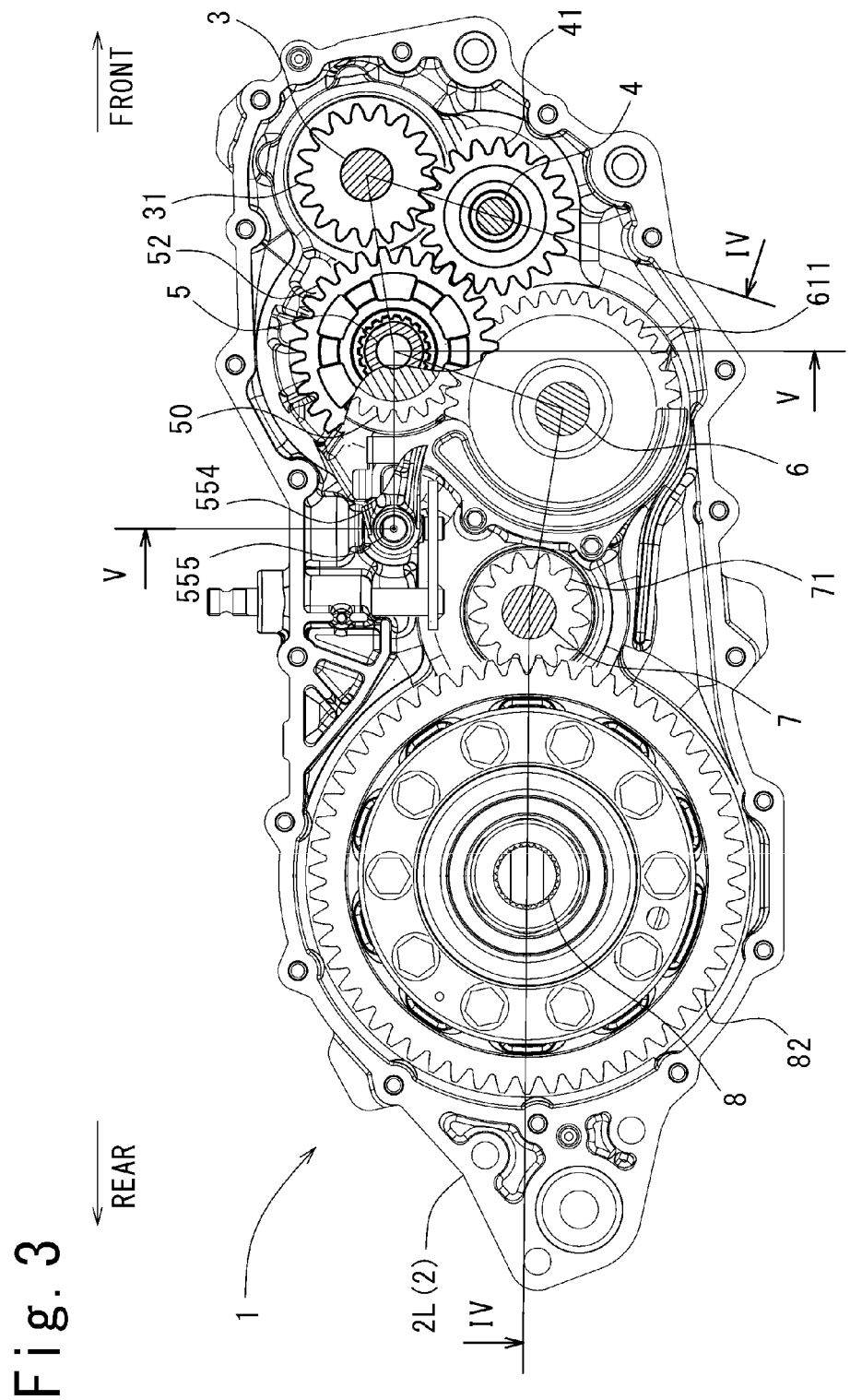
FIG. 3 is a right side view of a transmission, showing the inside of the transmission.

FIG. 3 is a right side view showing the inside of the transmission 1 with the right-side case member 2R (see FIG. 2) being removed. In the transmission 1, sequentially from the front side, the input shaft 3, a reverse idler shaft 4, a counter shaft (a transmission shaft) 5, a output shaft 6 for the front wheels 11, a intermediate output shaft 7 for the rear wheels 12, and the output shaft 8 for the rear wheels 12 are arrange with their shaft axes being directed to the vehicle width direction. Then, these shafts are rotatably supported by the right and the left side walls of the transmission case 2. A shift fork 554 and a shift rod 555 are provided behind the counter shaft 5.

Figure 4:
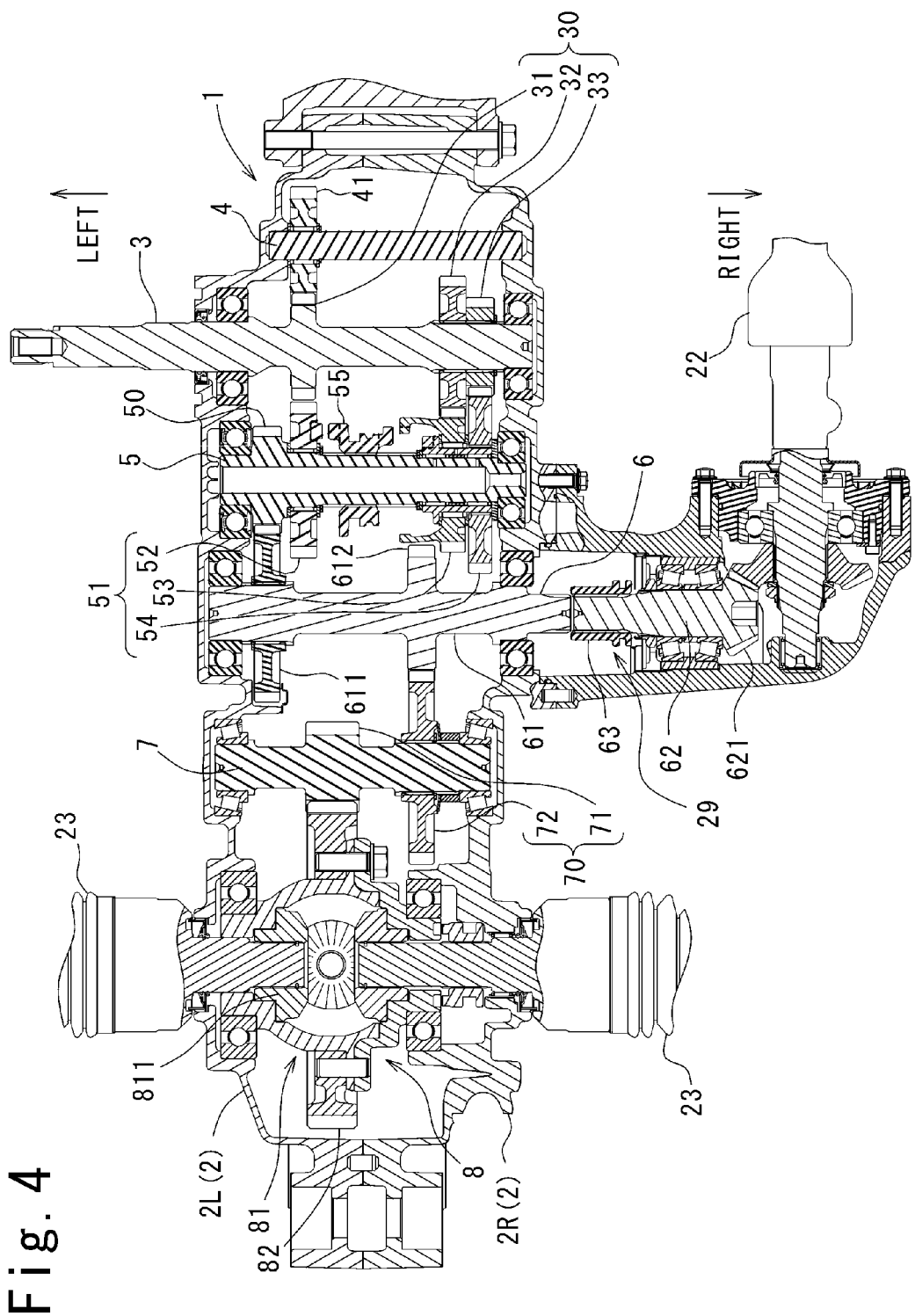
FIG. 4 is a development view taken along line IV-IV in FIG. 3, showing the engagement state of the gears.

FIG. 4 is a development view taken along line IV-IV in FIG. 3, showing the engagement state of the each shafts in the transmission 1. The input shaft 3, the counter shaft 5, the output shaft 6, and the intermediate output shaft 7 are rotatably supported by the left and the right case members 2L and 2R with bearings in between.

The reverse idler shaft 4 transmits to the counter shaft 5 the driving force inputted from the input shaft 3. The counter shaft 5 transmits to the output shaft 6 the driving force having been decelerated and then inputted directly from the input shaft 3 or the driving force inputted from the input shaft 3 through the reverse idler shaft 4. With transmitting the driving force to the intermediate output shaft 7, the output shaft 6 transmits the driving force to the propeller shaft 22 for the front wheels 11 extending in the forward and backward directions, selectively through the two-wheel drive to four-wheel drive change mechanism 29 and the bevel gear 621. The intermediate output shaft 7 transmits the driving force of the output shaft 6 to the output shaft 8. The output shaft 8 transmits the driving force to the drive shafts 23 for the rear wheels 12.

The input shaft 3 is thereon provided with an input gear group 30 composed of an input reverse gear 31 for backward movement, an input high gear 32 for high-speed forward movement, and an input low gear 33 for low-speed forward movement which are arranged sequentially from the left. The input reverse gear 31 is formed integrally on the input shaft 3. Then, the input high gear 32 and the input low gear 33 are axially non-movably spline-fit onto the input shaft 3.

On the reverse idler shaft 4, a reverse idle gear 41 for backward movement that always engages the input reverse gear 31 is rotatably arranged with a needle bearing in between.

On the counter shaft 5, a counter output gear 50 and a counter gear group 51 are provided sequentially from the left. The counter gear group 51 includes the counter reverse gear 52 for backward movement, the counter high gear 53 for high-speed forward movement, and the counter low gear 54 for low-speed forward movement. Between the counter reverse gear 52 and counter high gear 53, the shift sleeve 55 is axially movably spline-fit. The counter output gear 50 is formed integrally on the counter shaft 5. Then, each of the gears 52 to 54 of the counter gear group 51 are rotatably arranged on the counter shaft 5.

Each of the gears 52 to 54 of the counter gear group 51 always engage respectively with the corresponding gears 31 to 33 of the input gear group 30. That is, the counter reverse gear 52 is arranged such as to always engage with the input reverse gear 31 through the reverse idler gear 41. Further, the counter high gear 53 is arranged such as to always engage with the input high gear 32. Similarly, the counter low gear 54 is arranged such as to always engage with the input low gear 33. Thus, the driving force inputted to the input shaft 3 is transmitted to the counter shaft 5 through the dog coupling between any one of the gears 52 to 54 of the counter gear group 51 and the shift sleeve 55. Detailed description is given below with reference to FIG. 5.

Figure 5:
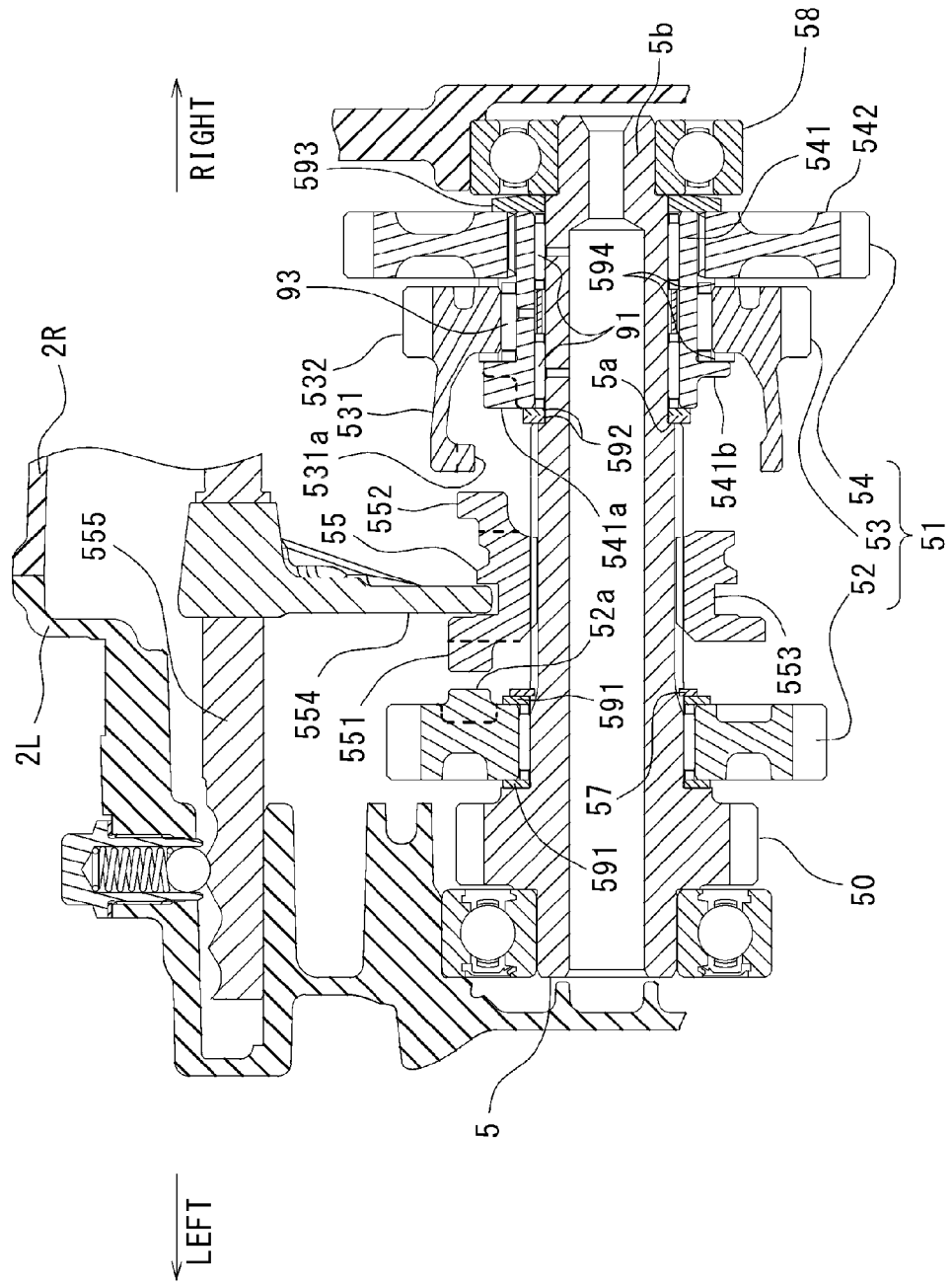
FIG. 5 is a sectional view taken along line V-V in FIG. 3.
Figure 6:
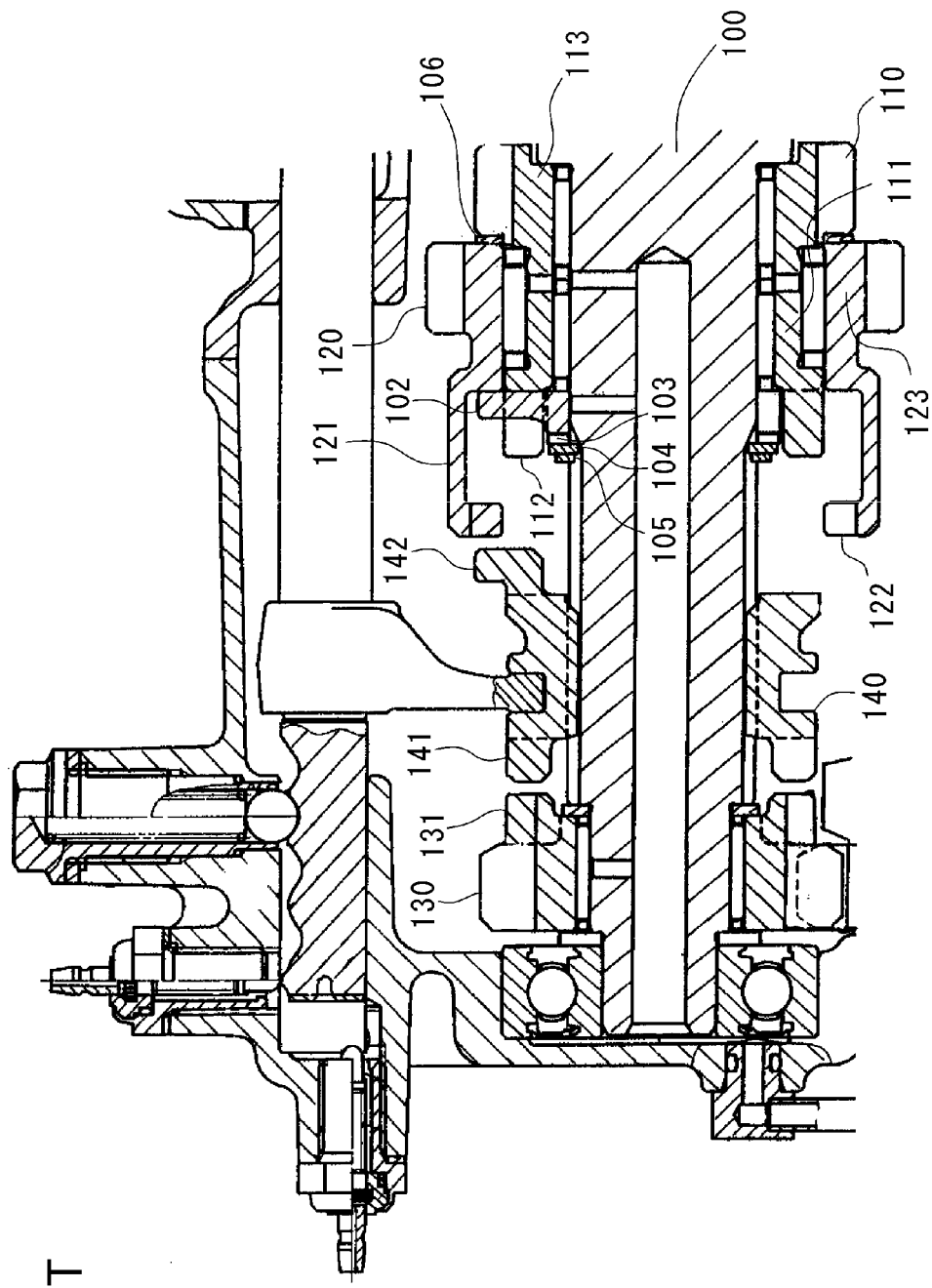
FIG. 6 is a sectional view showing a transmission having a structure according to the conventional art.

FIG. 5 is a sectional view taken along line V-V in FIG. 3. The counter reverse gear 52 includes dog claws 52a for backward movement provided on the right end surface and is rotatably arranged on the counter shaft 5 with a needle bearing in between.

The counter low gear 54 is rotatably arranged on the counter shaft 5 with a needle bearing 91 in between, and is divided into a boss part 541 extending leftward and a low-gear body part 542 (the first gear body) provided with gear teeth (the first gear teeth) formed on the outer periphery thereof. At the left end edge of the boss part 541, dog claws 541a (the first dog claws) for low-speed forward movement are integrally formed. Further, on the right side of the dog claws 541a, an expanded diameter part 541b is integrally formed. Thus, as shown in FIG. 5, the boss part 541, with the expanded diameter part 541b and the dog claws 541a, has a one-piece construction. The low-gear body part 542 is spline-fit onto the outer peripheral surface on the right side of the boss part 541.

The counter high gear 53 is arranged adjacent to the left side of the low-gear body part 542 with a washer 594 in between and is rotatably arranged on the outer periphery of the boss part 541 with a needle bearing 93 in between. Here, a high-gear body part 532 (the second gear body) provided with gear teeth (the second gear teeth) formed on the outer periphery and a cylindrical part 531 extending leftward from the high-gear body part 532 are integrally formed in the counter high gear 53. At the left end of the cylindrical part 531, dog claws 531a (the second dog claws) for high-speed forward movement oriented inwardly in the diameter direction are integrally formed.

Dog claws 551 for backward movement are formed on the left end surface of the shift sleeve 55. Further, dog claws 552 (the sleeve-side dog claws) for forward movement are formed on the right end surface of the shift sleeve 55.

The axis-directional interval between the dog claws 531a and the dog claws 541a is ensured to an extent that the dog claws 552 of the shift sleeve 55 movable in the axial direction can temporarily be in a neutral state that coupling to any of the dog claws 531a to 541a is not established.

The outer periphery of the shift sleeve 55 is provided with an outer periphery annular groove 553. Then, the single shift fork 554 is fit into the outer periphery annular groove 553. The shift fork 554 is fixed to the shift rod 555 and the shift rod 555 is supported by the left and the right case members 2L and 2R. The shift rod 555 is configured to be movable in the axial direction in response to gear-shift operation by the driver.

FIG. 5 shows a neutral state that both of the dog claws 551 and 552 of the shift sleeve 55 are not in dog coupling to any of the dog claws 52a, 531a, and 541a of the counter gear group 51. When the shift sleeve 55 is moved leftward from the neutral state, the dog claws 551 of the shift sleeve 55 engage with the dog claws 52a of the counter reverse gear 52. In contrast, when the shift sleeve 55 is moved rightward from the neutral state, the dog claws 552 of the shift sleeve 55 engage with the dog claws 531a of the counter high gear 53. Then, when the shift sleeve 55 is moved rightward further, the dog claws 552 of the shift sleeve 55 engage with the dog claws 541a of the counter low gear 54 after passing the neutral state.

That is, when the single shift fork 554 is moved in the axial direction so that dog coupling is established between the shift sleeve 55 and each gear of the counter gear group 51, the driving force inputted from the input gear group 30 to the counter gear group 51 is transmitted through the shift sleeve 55 to the counter shaft 5. Thus, the gear position can be changed selectively between four gear positions consisting of: a high-speed forward gear position that the counter high gear 53 and the counter shaft 5 are coupled to each other so that a driving force can be transmitted; a low-speed forward gear position that the counter low gear 54 and the counter shaft 5 are coupled to each other so that a driving force can be transmitted; a backward gear position that the counter reverse gear 52 and the counter shaft 5 are coupled to each other so that a driving force can be transmitted; and a neutral position that none of the gears 52 to 54 of the counter gear group 51 is coupled to the counter shaft 5 so that a driving force can be transmitted.

The counter reverse gear 52 is axially non-movably arranged between the counter output gear 50 and a circlip 57 fixed to the counter shaft 5, with a pair of right and left washers 591 in between. The boss part 541 of the counter low gear 54 is axially non-movably arranged between a step part 5a of the counter shaft 5 and a bearing 58 for supporting the right end part of the counter shaft 5, together with two washers 592 in the left end and a large diameter washer 593 in the right end part. The counter high gear 53 is arranged between the expanded diameter part 541b of the boss part 541 and the low-gear body part 542 with a pair of right and left washers 594 in between.

The each gears 52 to 54 of the counter gear group 51 are rotatably arranged on the counter shaft 5 and axially non-movably arranged with washers 591 to 594 in between. That is, the sliding parts between the counter shaft 5 and the each gears 52 to 54 of the counter gear group 51 are constructed from the washers 591 to 594. Then, in the each sliding parts, wear in the each gears 52 to 54 and/or the counter shaft 5 is restrained.

Here, in the right end of the counter shaft 5, the outer diameter (that is, inner diameter of the bearing 58) of the bearing fitting part 5b into which the bearing 58 is fit is configured to be smaller than the inner diameter of the boss part 541. Thus, the boss part 541 can be attached onto the outer periphery of the counter shaft 5 from the right side. Further, the inner diameter of the counter high gear 53 is configured to be larger than the outer diameter of the boss part 541 and the counter low gear 54 is divided into the boss part 541 and the low-gear body part 542. Thus, the counter high gear 53 can be attached onto the outer periphery of the boss part 541 from the right side.

That is, the counter low gear 54 and the counter high gear 53 can be attached onto the counter shaft 5 as follows. First, the two washers 592 are attached from the right side of the counter shaft 5 so as to be located at the step part 5a. Then, the boss part 541 of the counter low gear 54 is attached to the counter shaft 5 with the needle bearing 91 in between from the right side so as to be located on the right side of the washers 592. Then, the counter high gear 53 is attached from the right side of the counter shaft 5 so that the left end of the high-gear body part 532 is located adjacent to the expanded diameter part 541b of the boss part 541 with the washers 594 in between and arranged on the outer periphery of the boss part 541 with the needle bearing 93 in between.

Then, the low-gear body part 542 is attached from the right side of the counter shaft 5 so as to be adjacent to the right side surface of the high-gear body part 532 with the washer 594 in between and spline-fit onto the outer periphery of the boss part 541. At that time, when it is confirmed that the right side surface of the boss part 541 and the right side surface of the low-gear body part 542 are located approximately at the same position, it is concluded that components like washers have been attached without excess and deficiency.

At the last, when the large diameter washer 593 is attached from the right side of the counter shaft 5, the right end of the boss part 541 and the at least a part of right end of the low-gear body part 542 is positioned on the counter shaft 5. The right end of the large diameter washer 593 is supported by the bearing 58. That is, the counter low gear 54, the counter high gear 53, other washers, and the like can be attached to the counter shaft 5 from the right side. This permits advance-assembling of the component group like washers to be arranged in the inner side of the cylindrical part 531, to the counter shaft 5. Thus, the work is avoided that this component group is attached to the inner side of the cylindrical part 531 after the assembling of the counter high gear 53.

Next, returning to FIG. 4, the output shaft 6, the intermediate output shaft 7, and the output shaft 8 are described below. As shown in FIG. 4, the output shaft 6 includes a first output shaft 61 and a second output shaft 62 located on the right of the first output shaft 61. On the first output shaft 61, sequentially from the left, an input gear 611 always engaging with the counter output gear 50 of the counter shaft 5 and an output gear 612 for transmitting the driving force to the intermediate output shaft 7 are axially non-movably provided. The bevel gear 621 is integrally formed in the right end of the second output shaft 62. Then, through the bevel gear 621, the driving force is transmitted to the propeller shaft 22.

The two-wheel drive to four-wheel drive change mechanism 29 includes a two-wheel drive to four-wheel drive switching sleeve 63 axially movably spline-fit through from the right end of the first output shaft 61 to the left end of the second output shaft 62. FIG. 4 shows a state that the two-wheel drive to four-wheel drive switching sleeve 63 is located only on the second output shaft 62, that is, a state that the first output shaft 61 and the second output shaft 62 are not coupled to each other. From this state, when the two-wheel drive to four-wheel drive switching sleeve 63 is moved in the axial direction such as to bridge over the right end of the first output shaft 61 and the left end of the second output shaft 62 by a two-wheel drive to four-wheel drive switching actuator (not shown), the first output shaft 61 and the second output shaft 62 are coupled to each other.

That is, when the two-wheel drive to four-wheel drive switching sleeve 63 is moved in the axial direction, switching is achieved between a two-wheel drive mode that the first output shaft 61 and the second output shaft 62 are not coupled to each other and hence the driving force is transmitted only to the drive shafts 23 for rear wheel drive and a four-wheel drive mode that the first output shaft 61 and the second output shaft 62 are coupled to each other and hence the driving force is transmitted to the propeller shaft 22 and the drive shafts 23.

On the intermediate output shaft 7, a intermediate output gear group 70 for the rear wheels 12 composed of an output gear 71 and an input gear 72 is provided. The input gear 72 always engages with the output gear 612 of the first output shaft 61.

On the output shaft 8, a final deceleration mechanism 81 is provided, to which the driving force is transmitted through a larger diameter gear 82 always engaging with the output gear 71 of the intermediate output shaft 7. The driving force transmitted to the final deceleration mechanism 81 is divided by a differential device 811 and then transmitted to the pair of right and left drive shafts 23 for rear wheel drive.

According to the above-mentioned transmission 1, the driving force inputted from the crankshaft 21 of the engine 20 through the V-belt type continuously variable transmission 24 to the input shaft 3 is transmitted to the output shaft 6 and the output shaft 8 at a predetermined deceleration gear ratio and in a predetermined rotation direction. As a result, the front wheels 11 and the rear wheels 12 can be driven selectively in the low-speed forward gear position, the high-speed forward gear position, the neutral gear position, or the backward gear position.

Further, when the two-wheel drive to four-wheel drive switching sleeve 63 is moved in the axial direction of the output shaft 6, switching is achieved between the two-wheel drive mode that the rear wheels 12 alone are driven and the four-wheel drive mode that the front wheels 11 and the rear wheels 12 are both driven.

According to the transmission 1 having the above-mentioned configuration, the following effects are obtained.

(1) Since the counter low gear 54 is configured to be divided into the low-gear body part 542 and the boss part 541, the counter high gear 53 can be attached from the right side of the counter low gear 54. Thus, the two washers 592 that are arranged in the inner side of the cylindrical part 531 extending on the left side of the counter high gear 53 so as to position the left ends of the axial direction of the counter high gear 53 and the counter low gear 54 can be attached to the counter shaft 5 before the assembling of the counter high gear 53. That is, the work can be avoided that after the assembling of the counter high gear 53 to the counter shaft 5, the washers 592 are attached to the inner side of the cylindrical part 531 whose inside is hard to be seen.

Further, the expanded diameter part 541b can be formed in the boss part 541 integrally with the dog claws 541a for low-speed forward movement. Thus, the number of components arranged in the inner side of the cylindrical part 531 can be reduced. Accordingly, assembly workability to the inner side of the cylindrical part 531 whose inside is hard to be seen can be avoided and the number of components arranged in the inner side of the cylindrical part 531 can be reduced. This improves the assembly workability of the transmission 1.

(2) When it is confirmed that the right side surface of the boss part 541 and the right side surface of the low-gear body part 542 are located approximately at the same position, the assembled state of the gear structure can easily be checked.

(3) Although the counter low gear 54 is configured to be divided into the boss part 541 and the low-gear body part 542, both portions 541 and 542 are spline-fit to each other. This permits easy power transmission between the low-gear body part 542 and the boss part 541.

(4) When the counter high gear 53 and the counter low gear 54 are to be removed from the counter shaft 5 at the time of maintenance or the like, detachment and attachment of the counter high gear 53 and the counter low gear 54 are easily achieved from the right side of the counter shaft 5 without the necessity of removing other components such as the counter reverse gear 52 and the shift sleeve 55 located on the left side of these gears 53 and 54. This improves the maintainability of the transmission 1.

(5) The present invention can preferably be implemented in the gear structure of the transmission 1 provided with the low-speed forward gear position and the high-speed forward gear position. Further, the counter low gear 54 that tends to be inputted a larger torque is arranged near the bearing 58 of the counter shaft 5. This easily restrains deflection in the counter shaft 5.

Various deformations and changes may be made without departing from the spirit and the scope of the present invention described in the claims.

What is claimed is:

1. A gear structure of a transmission, comprising:
   a first gear including:
      a first gear body including first gear teeth formed on an outer periphery thereof, and
      a boss part fit into an inner diameter part of the first gear body so that a driving force can be transmitted therebetween, and the boss part having integral first dog claws and an integral expanded diameter part at a first end thereof extending in a first axial direction such that the boss part has a one-piece construction, and the boss part being axially non-movably and rotatably fit onto an outer periphery of a transmission shaft;
   a second gear including:
      a second gear body arranged in the first direction of the first gear body and including second gear teeth formed on an outer periphery thereof, and
      a cylindrical part including integral second dog claws at an end part extending in the first axial direction from the second gear body, and the second gear being axially non-movably and rotatably fit onto an outer periphery of the boss part; and
   a shift sleeve axially movably spline-fit onto the transmission shaft and arranged in the first direction relative to the second gear, the shift sleeve including sleeve-side dog claws capable of engaging with the first dog claws and the second dog claws,
   wherein the second gear body is axially non-movably arranged between the first gear body and the expanded diameter part.

2. The gear structure of a transmission according to claim 1, wherein
   a second end of the first gear body and a second end of the boss part of the first gear are located approximately at the same position in the axial direction.

3. The gear structure of a transmission according to claim 1, wherein
   the first gear body is spline-fit onto the outer periphery of the boss part.

4. The gear structure of a transmission according to claim 1, wherein
   a bearing for rotatably supporting a second end of the transmission shaft in a case member is arranged on a second side relative to the first gear, and an inner diameter of the bearing is smaller than an inner diameter of the boss part.

5. The gear structure of a transmission according to claim 4, wherein
   the first gear is a low gear for low-speed forward movement and the second gear is a high gear for high-speed forward movement.

* * * * *